March 12, 1968  A. S. MARCUS  3,372,494

METHOD AND ARTICLE FOR OBTAINING INFORMATION

Filed March 31, 1965

INVENTOR
ALAN S. MARCUS,

BY Harold L. Halpert
AGENT

United States Patent Office 3,372,494
Patented Mar. 12, 1968

3,372,494
METHOD AND ARTICLE FOR OBTAINING
INFORMATION
Alan S. Marcus, Allston, Mass.
(611 W. 111th St., Apt. 6, New York, N.Y. 10025)
Filed Mar. 31, 1965, Ser. No. 444,295
4 Claims. (Cl. 35—48)

This invention relates to a method and article for obtaining information.

Information seeking polls are old and well known but are difficult, and in many instances impossible to conduct because of a great reluctance on the part of the party questioned to answer, in writing, questions which are of a personal or confidential nature. Where respondents feel obligated to make a formal reply, their reluctance may take the form of giving incomplete or untruthful answers. There is also a great reluctance to answer questions because they present the party questioned with a task to perform in answering the questionnaire.

It is an object of this invention to provide a method for taking a poll which will reduce the reluctance to supply truthful answers to a single or to a plurality of questions and to motivate the party being questioned to perform the necessary tasks.

It is a further object of the invention to provide an article for carrying out the method.

In accordance with the invention the reluctance to answer is reduced by convincing the respondent that his answers will be maintained under conditions of absolute secrecy. The arrangement of the questions and answers demonstrate to the respondent that privacy of information is built into the poll. Reluctance to answer is further reduced by making the task of answering of such a simple character as to induce voluntary responses.

In conducting a poll according to the invention, a perforated card having questions printed in a selected arrangement on one side of the perforation and having designated places for answers on the other side of the perforation is supplied to selected respondents with a request to separate the card along the perforation and return the answer section only after the questions are answered. The respondent remains unknown and the questions which are answered are known only to those in possession of the question part of the questionnaire. Since secrecy, anonymity, and simplicity of task are present, a large percentage of truthful answers is obtained which not only produces great accuracy but reduces the number of samplings necessary to produce the desired results and reduces the costs for conducting the poll by a corresponding amount.

It is a further object of the invention to provide organizations with an article and method for obtaining information they desire, under conditions that meet their security needs and other requirements, while at the same time reducing reluctance of their clientele to supply useful answers. When the invention is used, information in the form obtained from respondents need not be copied or specially coded to maintain secrecy. Where information need not be copied or transformed, costs of duplication are avoided, opportunties for making errors are eliminated, and the information becomes immediately useful to the organization without a delay in time, which copying would otherwise cause.

While the questions are in the hands of the respondent, the arrangement of both questions and answers must be such as to make it easy to understand how to answer, and to make simple the task of answering. However, once the answers are in the hands of the organization initiating the inquiry, it becomes important that agents of the organization can easily read and understand the answers, singly and especially in large quantities of responses. The answer portion becomes easy to read when separated from the question portion, since the answer becomes more prominent when by itself and since it is easier to grasp smaller amounts of printed matter than larger amounts. What had been the middle of the article when in the hands of the respondent becomes an edge of the article when separated into question and answer portions. The availability of new edge or edges in the invention makes possible many easily read arrangements that would have created too demanding a task of responding in ordinary poll articles, where the place for putting answers is originally separate from the questions.

The invention may best be understood by reference to the following description taken in connection with the accompanying drawing wherein:

FIGURE 1 illustrates a poll card made in accordance with the invention.

FIG. 2 illustrates another form of card.

FIG. 3 illustrates a third form of card.

In FIG. 1 a card comprising a body portion 2 is perforated as at 8 to provide a question portion 4 and an answer portion 6. Questions relating to the poll are printed on the question portion adjacent the perforation and the answers to the questions are made in the indicated places in the answer portion. In the forms of the invention illustrated, the questions can be answered by "YES" or "NO" and the answer can be made by marking the appropriate box 9. The mark may be made by pen or pencil, for example, in which case it is necessary to merely print the boxes. However, it is preferred to weaken the material such as by partial cutting on the outline of the boxes so that the material in the box can be removed by finger pressure. In this manner the respondent is motivated to act without procrastination in the event writing equipment is not at hand.

In the form of the invention illustrated in FIG. 2, the body 2 is perforated as at 16 and 18 to provide two question portions 10 and 14 and a single answer portion 12. This form can be used to carry out two polls at the same time where a single party is interested in the information of both polls.

In the form of the invention illustrated in FIG. 3, two polls can be carried on simultaneously in which different parties are interested in the separate polls. In this case the body is perforated as at 26 and 28 to provide two answer portions 20 and 24 with a single question portion 22.

In use, the card is supplied to selected respondents with a request to answer the questions. When the questions have been answered the respondent is instructed to separate the questions from the answers by separating along the perforations and to return the answers to the poll taker. In the event the poll is taken by mail the answer portion of the card is made of a size and material to comply with postal regulations and is printed on the reverse side with the name and address of the poll taker. In the event the poll is taken at a convention, for example, the material of the card and the size of the answer portion is dictated by considerations of convience.

The invention has been explained by illustrating and describing various specific forms but it will be apparent that arrangements other than that shown may be used without departing from the spirit of the invention and the scope of the appended claims.

What I claim as new and desire to secure by Letters Patent of the United States, is:

1. A poll questionnaire form for taking a plurality of polls simultaneously comprising a body portion, at least one pair of perforations dividing the body portion into a question portion and a pair of answer portions, selected questions being printed on the question portion adjacent the perforations and being pertinent to answers on the answer portion adjacent thereto, and means designating the places on the answer portions for recording the answers on the answer portion.

2. A device as defined in claim 1 wherein the means designating the answers on the answer portion comprises weakened areas which can be removed by finger pressure.

3. A poll questionnaire form for taking a plurality of polls simultaneously comprising a body portion, at least one pair of perforations dividing the body portion into an answer portion and a pair of question portions, selected questions being printed on the questions adjacent the perforations and being pertinent to answers on the answer portion adjacent thereto, and means designating the places on the answer portion for recording the answers on the answer portion.

4. A device as defined in claim 3 wherein the means designating the answers on the answer portion comprises weakened areas which can be removed by finger pressure.

References Cited

UNITED STATES PATENTS

| | | | |
|---|---|---|---|
| 448,403 | 3/1891 | Adams | 283—5 |
| 3,136,567 | 6/1964 | Smith | 282—25 |
| 3,151,403 | 10/1964 | Sinex | 35—9 |

FOREIGN PATENTS 692,624   8/1964   Canada.

EUGENE R. CAPOZIO, *Primary Examiner.*

W. W. NIELSEN, R. E. KLEIN, *Assistant Examiners.*